US012785176B2

(12) United States Patent
Shrivastava et al.

(10) Patent No.: US 12,785,176 B2
(45) Date of Patent: Nov. 3, 2026

(54) BATTERY THERMAL MANAGEMENT VIA HEAT FROM WATER COOLED CONDENSER

(71) Applicant: FORD GLOBAL TECHNOLOGIES, LLC, Dearborn, MI (US)

(72) Inventors: Rohan Shrivastava, Livonia, MI (US); Jordan Mazaira, Taylor, MI (US); James C. Rollinson, Superior Township, MI (US); Scott Vehige, Woodhaven, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 760 days.

(21) Appl. No.: 18/307,392

(22) Filed: Apr. 26, 2023

(65) Prior Publication Data

US 2024/0363925 A1 Oct. 31, 2024

(51) Int. Cl.

| | |
|---|---|
| ***H01M 10/65*** | (2014.01) |
| ***B60H 1/00*** | (2006.01) |
| ***H01M 10/625*** | (2014.01) |
| ***H01M 10/6569*** | (2014.01) |

(52) U.S. Cl.

CPC .... *H01M 10/6569* (2015.04); *B60H 1/00278* (2013.01); *B60H 1/00885* (2013.01); *H01M 10/625* (2015.04); *B60H 2001/00307* (2013.01); *H01M 2220/20* (2013.01)

(58) Field of Classification Search

CPC ............. H01M 10/625; H01M 10/633; H01M 10/6569; H01M 10/615; H01M 10/6556; H01M 10/6568; H01M 10/663; H01M 2220/20; B60H 1/32281; B60H 1/00278; B60H 1/00385; B60H 1/00885; B60H 2001/00307; B60H 2001/00928; B60L 2240/545

See application file for complete search history.

(56) References Cited

U.S. PATENT DOCUMENTS

| | | | | |
|---|---|---|---|---|
| 11,453,264 | B2 | 9/2022 | Kurasawa et al. | |
| 2017/0106724 | A1 * | 4/2017 | Porras | H01M 10/44 |
| 2017/0197488 | A1 | 7/2017 | Kim et al. | |
| 2017/0309976 | A1 * | 10/2017 | Lambert | B60H 1/00278 |
| 2017/0358833 | A1 * | 12/2017 | Jalilevand | H01M 10/663 |

(Continued)

FOREIGN PATENT DOCUMENTS

| | | | | |
|---|---|---|---|---|
| CN | 113135081 A | * | 7/2021 | B60H 1/00278 |
| CN | 115133171 A | | 9/2022 | |

(Continued)

OTHER PUBLICATIONS

English translation of CN 113135081A (Year: 2021).*
English translation of KR 20190118757A (Year: 2019).*

*Primary Examiner* — Tho V Duong
(74) *Attorney, Agent, or Firm* — David B. Kelley; Brooks Kushman P.C.

(57) ABSTRACT

A controller, while operating an evaporator to remove heat from air in a cabin and during absence of requests to heat the cabin and a traction battery, flows coolant from a water cooled condenser to a circuit arranged to exchange heat with the traction battery until a temperature of the traction battery is less than a battery threshold temperature or a temperature of the coolant is greater than a coolant threshold temperature.

15 Claims, 2 Drawing Sheets

(56) References Cited

U.S. PATENT DOCUMENTS

| | | | | |
|---|---|---|---|---|
| 2018/0215231 | A1* | 8/2018 | Porras .................... | B60H 1/323 |
| 2020/0171916 | A1* | 6/2020 | Shrivastava ....... | B60H 1/00807 |
| 2023/0074313 | A1* | 3/2023 | Mazaira ............. | H01M 10/613 |

FOREIGN PATENT DOCUMENTS

| | | | | | |
|---|---|---|---|---|---|
| DE | 102020107352 | A1 | | 10/2020 | |
| KR | 20170008603 | A | | 1/2017 | |
| KR | 20190118757 | A | * | 10/2019 | ......... B60H 1/00885 |

* cited by examiner

BATTERY THERMAL MANAGEMENT VIA HEAT FROM WATER COOLED CONDENSER

TECHNICAL FIELD

The present disclosure relates to an automotive system for heating a traction battery of a vehicle, using heat from the water cooled condenser of a heat pump.

BACKGROUND

Electric and hybrid vehicles include electric machines that are typically powered by traction batteries. A traction battery may provide a high-voltage direct current (DC) as the output. The output power delivered by the battery and the input power consumed by the battery may be functions of the traction battery temperature. Under cold and mild ambient temperatures, the traction battery may be unable to perform at its peak performance. It may therefore be required to heat the battery if better performance is desired.

SUMMARY

A method includes, responsive to an evaporator of an automotive heat pump system operating to remove heat from air in a cabin and absence of requests to heat the cabin and cool a traction battery, flowing coolant from a water cooled condenser in thermal communication with the evaporator to a circuit arranged to exchange heat with the traction battery for as long as a temperature of the traction battery is less than a battery threshold temperature and a temperature of the coolant is greater than a coolant threshold temperature.

A vehicle includes a cabin, a heat pump system including an evaporator and a water cooled condenser in thermal communication with the evaporator, a traction battery, a circuit arranged to exchange heat with the traction battery, and a controller. The controller, while operating the evaporator to remove heat from air in the cabin and during absence of requests to heat the cabin and the traction battery, flows coolant from the water cooled condenser to the circuit until a temperature of the traction battery is less than a battery threshold temperature or a temperature of the coolant is greater than a coolant threshold temperature.

An automotive system includes a controller that, responsive to an evaporator of an automotive heat pump system operating to remove heat from air in a cabin and absence of requests to heat the cabin and a traction battery, flows coolant from a water cooled condenser in thermal communication with the evaporator to a circuit arranged to exchange heat with the traction battery for as long as a temperature of the traction battery is less than a battery threshold temperature and a temperature of the coolant is greater than a coolant threshold temperature, and responsive to the evaporator no longer operating to remove the heat from the air in the cabin, discontinues the flow.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An electric or hybrid vehicle may include a heat pump. Typically, a heat pump includes a water cooled condenser in thermal communication with an evaporator. Arrangements proposed herein may use excess heat from the heat pump, particularly from the water cooled condenser, to heat a traction battery.

Figure 1:
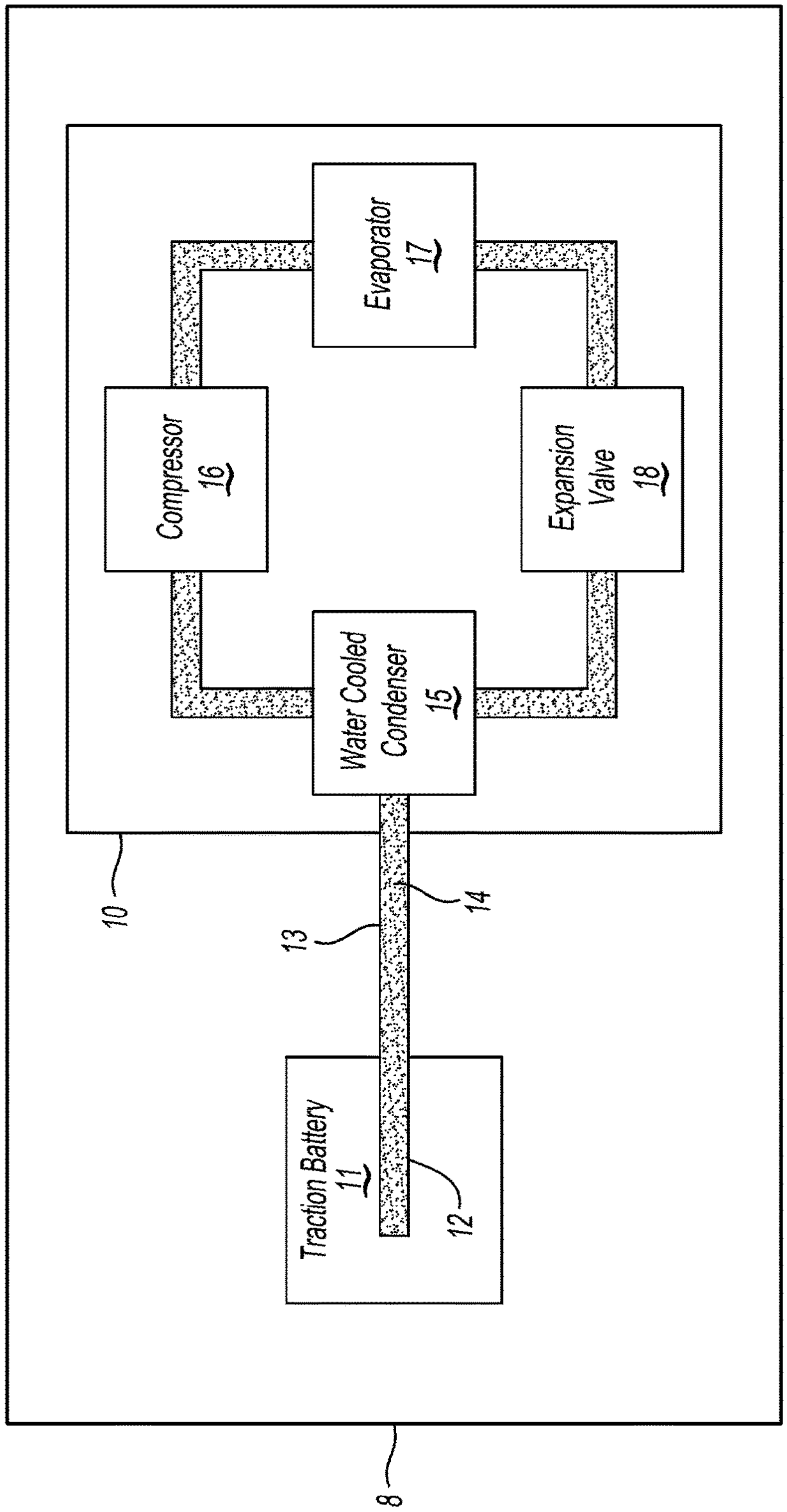
FIG. 1 is a schematic diagram of a heat pump in thermal communication with a traction battery.

FIG. 1 illustrates a vehicle 8 including heat pump 10 in thermal communication with a traction battery 11, that has a battery coolant circuit 12. The heat pump 10 includes a water cooled condenser (WCC) 15, a compressor 16, an evaporator 17, and an expansion valve 18, all in thermal communication with each other. The heat pump 10 may also include coolant pipe 13 with coolant 14 flowing through it.

Heat exchange may occur at the compressor 16 of the heat pump 10. For instance, the coolant 14 in the form of a warm gas at low pressure may enter the compressor 16. The coolant 14 in the form of a hot gas at high temperature may exit the compressor 16.

Heat exchange may occur at the WCC 15 of the heat pump 10 as well. For example, the coolant 14 in the form of a hot gas at high pressure may enter the WCC 15. The coolant 14 in the form of a hot liquid at high pressure may exit the WCC 15. In other words, the coolant 14 in the form of a hot gas may be condensed at the WCC 15 and the heat is extracted from the coolant 14, thereby cooling the coolant 14.

Heat exchange may happen at the evaporator 17 of the heat pump 10 as well. For instance, the coolant 14 in the form of a cold liquid liquid/gas at low pressure may enter the evaporator 17. The coolant 14 in the form of a warm gas at low pressure may exit the evaporator 17. In other words, the coolant 14 heats up at the evaporator 17. The coolant 14 may be evaporated in the evaporator 17, and the evaporation may be because of the outside air. A typical coolant may boil at very low temperature. As an example, R **134*a*** boils at −15 degrees Fahrenheit.

Heat exchange may occur at the expansion valve 18 of the heat pump 10 as well. For instance, the coolant 14 in the form of a hot liquid at high pressure enters the expansion valve 18. The coolant 14 in the form of a cold liquid/gas at low temperature may exit the expansion valve 18. The expansion valve 18 may also control the rate at which the coolant 14 enters the evaporator 17, ensuring that a cold liquid/gas at low temperature enters the evaporator 17.

The heat pump 10 may operate in a cooling mode or in a heating mode. The heat pump 10 may operate in a heating mode when the cabin 20 (FIG. 2) requests and/or requires heating. In the heating mode, the coolant 14 in the form of a hot gas at high pressure may enter the WCC 15, whereas the coolant 14 in the form of a hot liquid at high pressure may exit the WCC 15. Therefore, the heat may be exchanged at the WCC 15, such that the coolant 14 is condensed and cooled at the WCC 15. Any extracted and excess heat at the WCC 15 may be transferred to the cabin 20 to heat the cabin 20. The heat from the WCC 15 may also be used to heat the traction battery.

The heat pump 10 may also operate in a cooling mode. The heat pump 10 may operate in a cooling mode when the cabin 20 requests and/or requires cooling. In the cooling mode, the coolant 14 in the form of a cold liquid liquid/gas at low pressure may enter the evaporator 17, whereas the coolant 14 in the form of a warm gas at low pressure may exit the evaporator 17. Therefore, the coolant 14 may absorb heat from the outside air. The cooler air may be transferred into the cabin 20 to cool the cabin 20.

During the cooling mode, the coolant 14 in the form of a hot gas at high pressure may still enter the WCC 15, and the coolant 14 in the form of a hot liquid at high pressure may exit the WCC 15. Therefore, heat may still be absorbed from the coolant 14 at the WCC 15 during the cooling mode. The condensation of the liquid in WCC 15 may not be perfect, and the exiting coolant 14 from WCC 15 may still be hot. The excess/waste heat from the WCC 15 may be used to warm the traction battery 11.

Moreover, the coolant 14 may remain inside the WCC 15 if no coolant flow is requested. In absence of coolant flow, the coolant 14 inside the WCC 15 may keep rising in temperature, which may result in some coolant 14 dissipating into the environment. The excess/waste heat from the coolant 14 in the WCC 15 may be utilized to warm the traction battery 11 and bring it to the optimal temperature for peak performance.

Figure 2:
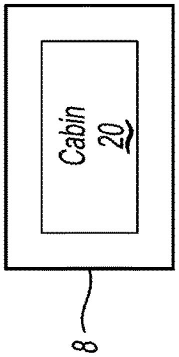
FIG. 2 is a schematic diagram of a cabin.

FIG. 2 illustrates a cabin 20 of the vehicle 8. It may be requested and/or required that the cabin 20 be cooled or heated. The cabin 20 may be heated or cooled using heat or cold from the heat pump 10. The heat pump 10 may operate in a cooling mode when the cabin 20 requests and/or requires cooling. The heat pump 10 may operate in a heating mode when the cabin 20 requests and/or requires cooling.

Figure 3:
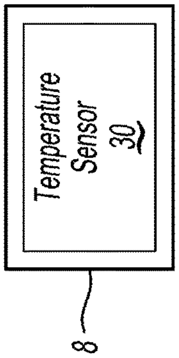
FIG. 3 is a schematic diagram of a temperature sensor.

FIG. 3 illustrates a temperature sensor 30. The temperature sensor 30 may determine the temperature of the traction battery 11. In one instance, the temperature of the traction battery 11 may be below a threshold. In another instance, the temperature of the traction battery 11 may be greater than a given threshold value. The temperature sensor 30 may be a plurality of sensors. The temperature sensor 30 may also determine the temperature of the coolant 14 at the WCC 15.

Figure 4:
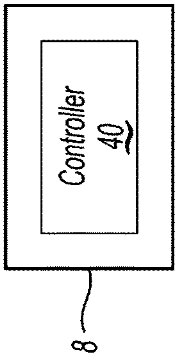
FIG. 4 is a schematic diagram of a controller.

FIG. 4 Illustrates a controller 40. The controller 40 may be programmed to control the operations of the heat pump 10 and hence control the flow of the coolant 14, thereby heating the traction battery 11. The controller 40 may also be programmed to determine if certain conditions are met.

Figure 5:
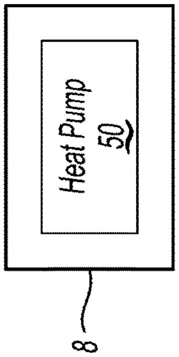
FIG. 5 is a schematic diagram of a pump.

FIG. 5 Illustrates a pump 50 (e.g., a heat pump). The pump 50 may be used to pump the coolant 14 to and from the heat pump 10 and the traction battery 11. The pump 50 may also be used to pump the coolant 14 at any point therein between.

Figure 6:
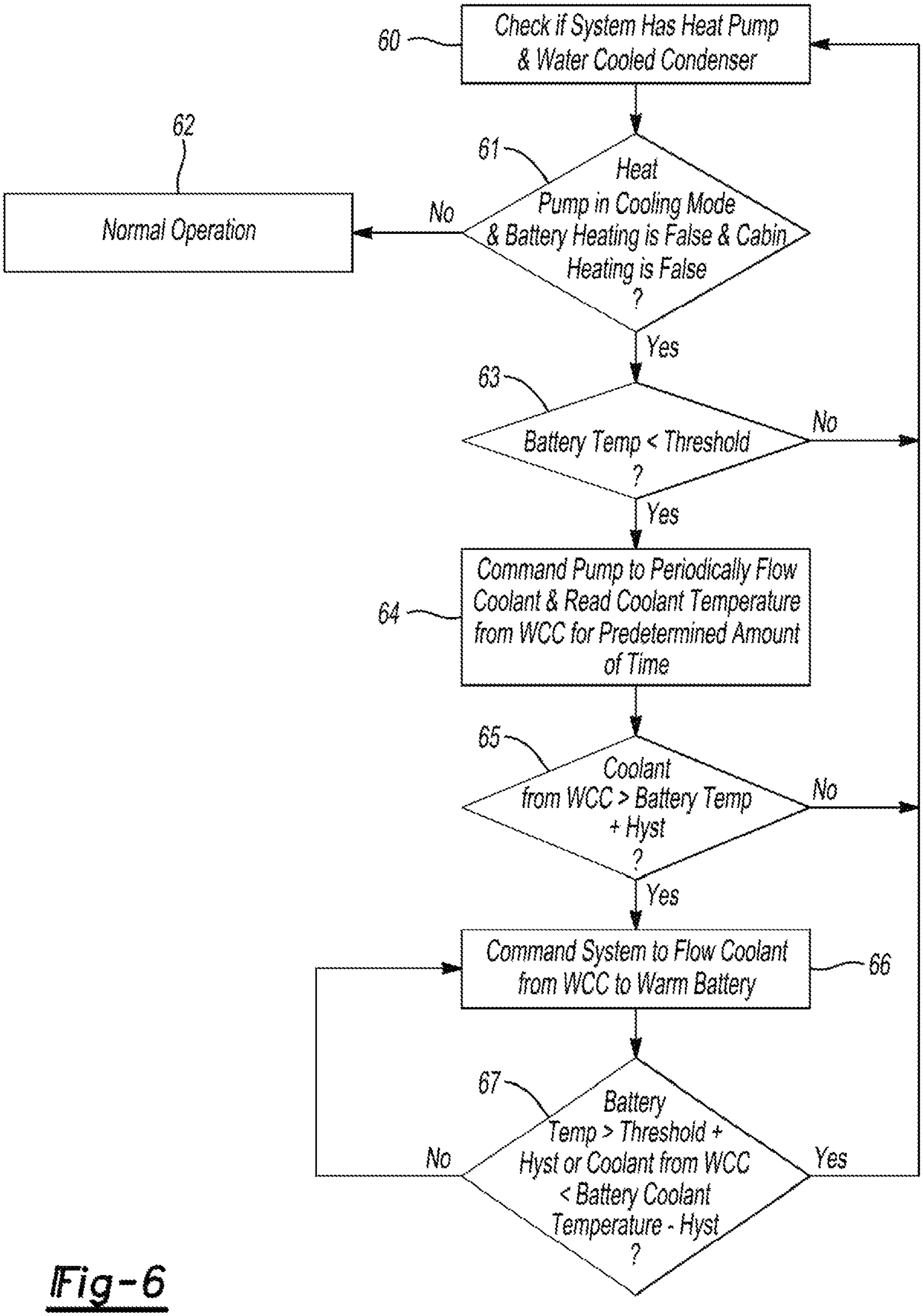
FIG. 6 is a flow chart of an algorithm implemented by the controller of FIG. 4.

FIG. 6 is a flow diagram illustrating a method to heat the traction battery 11. Waste heat scavenging from the heat pump 10 and using it to warm the traction battery 11 may positively affect the performance of the traction battery 11.

At step 60, the controller 40 determines if the system has a heat pump 10 and a WCC 15. Standard sensing and/or communication technology may be used to detect absence/presence of such. If the controller 40 determines that the heat pump 10 and WCC 15 exist, the control passes to step 61.

At step 61, the controller 40 may determine whether the heat pump 10 is in a cooling mode. Sensed or communicated values associated with heat pump operation may be inspected for this determination The heat pump 10 may operate in a cooling mode when the cabin 20 requests and/or requires cooling. The cooling mode of the heat pump 10 is described in more detail above. During the cooling mode, there may be excess/waste heat available at the WCC 15. The excess/waste heat from the WCC 15 may be used to warm the traction battery 11. Scavenging heat in cooling mode ensures that cabin 20 heating is unaffected.

At step 61, the controller 40 may also determine if traction battery heating is false. In other words, the controller 40 determines that the traction battery 11 is not already being heated via sensed or communicated values associated with operation of the traction battery 11.

At step 61, the controller 40 may also determine if cabin heating is false. The cabin heating is false when the cabin heating is not requested and/or required. Sensed or communicated values associated with cabin heating may be inspected for this determination. Not scavenging heat when the cabin 20 is being heated ensures that the cabin heating is unaffected.

If the controller 40 determines at step 61 that the heat pump 10 is in cooling mode, and the traction battery 11 heating is false, and/or cabin heating is false, the control passes to step 63. Otherwise, the control may pass to step 62, and normal operation may resume. An example of normal operation is when the waste heat from the WCC 15 is not being used to heat the traction battery 11.

At step 63, the controller 40 determines if the temperature of the traction battery 11, which can be sensed or estimated, is below a threshold value. When the temperature of the traction battery 11 is determined to be below a threshold value, the traction battery 11 may require heating, and the control passes to step 64. Otherwise, the control may pass to an earlier step, which may be step 60.

At step 64, the controller 40 may command the pump 50 to periodically flow the coolant 14 and read the temperature of the coolant 14 at the WCC 15 for a predetermined amount of time. For instance, the coolant 14 may flow through the WCC 15 periodically for 15 seconds before a temperature reading is taken to obtain a proper temperature reading for the coolant temperature at the WCC 15. The control may then pass to step 65.

At step 65, the controller 40 determines if the temperature of the coolant 14 from the WCC 15 is greater than the traction battery 11 temperature. If the temperature of the coolant 14 from the WCC 15 is greater than the traction battery 11 temperature, the control may pass to step 66. Otherwise, the control may revert back to an earlier step, which may be step 60.

At step 66, the controller 40 may command the pump 50 to flow the coolant 14 from the WCC 15 to the traction battery 11 to warm the traction battery 11. The coolant 14 may flow from the WCC 15 to the battery coolant circuit 12 arranged to exchange heat with the traction battery 11 to warm the traction battery 11. The control may then pass to step 67.

At step 67, the controller 40 may determine if the temperature of the traction battery is less than a battery temperature threshold value. The controller 40 may also determine if the temperature of the coolant 14 from the WCC 15 is greater than the coolant 14 temperature at the traction battery 11. If the controller 40 determines that the temperature of the traction battery 11 is less than a battery temperature threshold value, or if the temperature of the coolant 14 from the WCC 15 is greater than the coolant 14 temperature at the traction battery 11, the control may pass to step 66. Otherwise, for instance in situations where the traction battery 11 temperature is determined to be greater than a threshold value, the control may pass to step 60, thereby reducing heating of the traction battery 11.

The above may have several advantages. It utilizes waste/excess heat from the WCC 15 to warm the traction battery 11, thus affecting the performance of the traction battery 11. It may not require any additional components and may utilize an existing heat pump thermal system. It may also save energy that might have been consumed to increase the temperature of the traction battery 11. The proposed system may also favorably affect the overall system performance, for instance by reducing the coolant temperature passing through any outside heat exchanger.

The above may take several forms. In one example, a method includes responsive to an evaporator of an automotive heat pump system operating to remove heat from air in a cabin and absence of requests to heat the cabin and a traction battery, flowing coolant from a water cooled condenser in thermal communication with the evaporator to a circuit arranged to exchange heat with the traction battery for as long as a temperature of the traction battery is less than a battery threshold temperature and a temperature of the coolant is greater than a coolant threshold temperature. The method may further include flowing the coolant past a temperature sensor for a predefined duration of time prior to measuring the temperature of the coolant, responsive to a request to heat the cabin, discontinuing the flowing, and/or responsive to the evaporator no longer operating to remove the heat from the air in the cabin, discontinuing the flowing. The coolant threshold temperature may be greater than the battery threshold temperature.

In another example, a vehicle includes a cabin, a heat pump system including an evaporator and a water cooled condenser in thermal communication with the evaporator, a traction battery, a circuit arranged to exchange heat with the traction battery, and a controller. The controller, while operating the evaporator to remove heat from air in the cabin and during absence of requests to heat the cabin and the traction battery, flows coolant from the water cooled condenser to the circuit until a temperature of the traction battery is less than a battery threshold temperature or a temperature of the coolant is greater than a coolant threshold temperature. The controller may further flow the coolant past a temperature sensor for a predefined duration of time prior to measuring the temperature of the coolant, in response to a request to heat the cabin, discontinue the flow, and/or in response to the evaporator no longer operating to remove the heat from the air in the cabin, discontinue the flow. The heat pump system may further include a refrigerant and the water cooled condenser may be in thermal communication with the evaporator via the refrigerant. The coolant threshold temperature may be greater than the battery threshold temperature.

In yet another example, an automotive system includes a controller that, responsive to an evaporator of an automotive heat pump system operating to remove heat from air in a cabin and absence of requests to heat the cabin and a traction battery, flows coolant from a water cooled condenser in thermal communication with the evaporator to a circuit arranged to exchange heat with the traction battery for as long as a temperature of the traction battery is less than a battery threshold temperature and a temperature of the coolant is greater than a coolant threshold temperature, and responsive to the evaporator no longer operating to remove the heat from the air in the cabin, discontinues the flow. The controller may further flow the coolant past a temperature sensor for a predefined duration of time prior to measuring the temperature of the coolant, and/or in response to a request to heat the cabin, discontinue the flow. The coolant threshold temperature may be greater than the battery threshold temperature.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of these disclosed materials. The terms "controller" and "controllers," for example, can be used interchangeably herein.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method comprising:

responsive to an evaporator of an automotive heat pump system operating to remove heat from air in a cabin and absence of requests to heat the cabin and a traction battery, flowing coolant from a water cooled condenser in thermal communication with the evaporator to a circuit arranged to exchange heat with the traction battery for as long as a temperature of the traction battery is less than a battery threshold temperature and a temperature of the coolant is greater than a coolant threshold temperature.

2. The method of claim 1 further comprising flowing the coolant past a temperature sensor for a predefined duration of time prior to measuring the temperature of the coolant.

3. The method of claim 1 further comprising, responsive to a request to heat the cabin, discontinuing the flowing.

4. The method of claim 1, wherein the coolant threshold temperature is greater than the battery threshold temperature.

5. The method of claim 1 further comprising, responsive to the evaporator no longer operating to remove the heat from the air in the cabin, discontinuing the flowing.

6. A vehicle comprising:

a cabin;

a heat pump system including an evaporator and a water cooled condenser in thermal communication with the evaporator;

a traction battery;

a circuit arranged to exchange heat with the traction battery; and a controller programmed to, while operating the evaporator to remove heat from air in the cabin and during absence of requests to heat the cabin and the traction battery, flow coolant from the water cooled condenser to the circuit when a temperature of the traction battery is less than a battery threshold temperature and a temperature of the coolant is greater than the temperature of the traction battery, and continue to flow the coolant until the temperature of the traction battery is greater than the battery threshold temperature or the temperature of the coolant from the water cooled condenser is less than the temperature of the traction battery.

7. The vehicle of claim 6 further comprising a temperature sensor, wherein the controller is further programmed to flow the coolant past the temperature sensor for a predefined duration of time prior to measuring the temperature of the coolant.

8. The vehicle of claim 6, wherein the controller is further programmed to, in response to a request to heat the cabin, discontinue the flow.

9. The vehicle of claim 6, wherein the coolant threshold temperature is greater than the battery threshold temperature.

10. The vehicle of claim 6, wherein the controller is further programmed to, in response to the evaporator no longer operating to remove the heat from the air in the cabin, discontinue the flow.

11. The vehicle of claim 6, wherein the heat pump system further includes a refrigerant and wherein the water cooled condenser is in thermal communication with the evaporator via the refrigerant.

12. An automotive system comprising:

a controller programmed to responsive to an evaporator of an automotive heat pump system operating to remove heat from air in a cabin and absence of requests to heat the cabin and a traction battery, flow coolant from a water cooled condenser in thermal communication with the evaporator to a circuit arranged to exchange heat with the traction battery for as long as a temperature of the traction battery is less than a battery threshold temperature and a temperature of the coolant is greater than a coolant threshold temperature; and responsive to the evaporator no longer operating to remove the heat from the air in the cabin, discontinue the flow.

13. The automotive system of claim 12, wherein the controller is further programmed to flow the coolant past a temperature sensor for a predefined duration of time prior to measuring the temperature of the coolant.

14. The automotive system of claim 12, wherein the controller is further programmed to, in response to a request to heat the cabin, discontinue the flow.

15. The automotive system of claim 12, wherein the coolant threshold temperature is greater than the battery threshold temperature.

* * * * *